May 20, 1958 R. L. PRICE 2,835,732

SYNC SEPARATOR COMPRISING ELECTRO-MECHANICAL RESONANT LINE

Filed June 22, 1951 3 Sheets-Sheet 1

INVENTOR.
ROBERT LEE PRICE
BY Francis W. Crotty
ATTORNEY.

DISCHARGE TIME CONSTANT OF CLIPPER
INPUT CIRCUIT GREATER THAN EFFECTIVE
TIME CONSTANT OF PULSE-STORAGE LINE

INVENTOR.
Robert Lee Price
BY Francis W. Crotty
ATTORNEY

May 20, 1958 R. L. PRICE 2,835,732

SYNC SEPARATOR COMPRISING ELECTRO-MECHANICAL RESONANT LINE

Filed June 22, 1951 3 Sheets-Sheet 3

INVENTOR.
ROBERT LEE PRICE
BY Francis W. Crotty
ATTORNEY

United States Patent Office 2,835,732

Patented May 20, 1958

2,835,732

SYNC SEPARATOR COMPRISING ELECTROMECHANICAL RESONANT LINE

Robert Lee Price, Barrington, Ill., assignor to Zenith Radio Corporation, a corporation of Illinois Application June 22, 1951, Serial No. 233,039

10 Claims. (Cl. 178—7.5)

This invention relates to synchronizing systems and more particularly to systems for maintaining scanning synchronism in a television receiver or the like.

In accordance with conventional practice, a transmitted television signal comprises video-signal components and synchronizing-signal components alternating in time sequence. The video-signal components are representative of the picture information while the synchronizing-signal components are indicative of the timing of the scan. For proper reproduction of the image, it is necessary not only that the video-signal components be detected and applied to an image-reproducing device but also that some system be employed for maintaining the scanning operation at the receiver in synchronism with that employed at the transmitter.

In accordance with one known receiver synchronizing system, the incoming synchronizing-signal pulses are employed to trigger directly a pair of scanning-signal generators which in turn are coupled to a deflection system associated with the image-reproducing device to effect scanning in two coordinate directions. One inherent difficulty with a system of this type is its inability to operate in the absence of incoming pulses. If for any reason one or more line-frequency synchronizing-signal pulses fail to reach the synchronizing circuits, the line-frequency scanning-signal generator falls out of synchronism and a corresponding portion of the reproduced image is lost, a phenomenon commonly referred to as "tearing out" of the image.

In order to prevent tearing out of the image under normal operating conditions, most commercially produced television receivers at the present time employ some type of automatic frequency control in the line-frequency synchronizing system. In general, the incoming line-frequency synchronizing-signal pulses are compared in phase with a signal produced by a local oscillator operating at a free-running frequency approximating the repetition frequency of the line-synchronizing pulses. A unidirectional control signal from the phase-comparing device, representative of the phase difference between the synchronizing pulses and the locally-generated signal, is first smoothed by a filter and then applied to a reactance tube or otherwise employed to control the operating frequency of the local oscillator. The frequency-controlled output of the local oscillator is used to drive the line-frequency scanning-signal generator. The effect of such automatic frequency control is to render the scanning system jointly responsive to the synchronizing-signal pulses extending over a number of line intervals, so that image reproduction is not disturbed by the loss of several successive synchronizing pulses.

While automatic frequency control systems are quite effective and permit high quality image reproduction, their use involves a considerable additional expense as compared with the simpler but less effective system of triggered synchronization. Numerous proposals have been made in an effort to obtain the benefits of automatic frequency control at reduced cost. One such system employs a passive oscillatory circuit or ringing circuit tuned to the repetition frequency of the line-synchronizing pulses. Such circuits integrate the effect of individual synchronizing pulses. With circuits of this type, however, a compromise must be made between the number of line intervals which may be integrated and the stability of picture centering. A ringing circuit of high Q is desirable to provide effective noise discrimination, but high Q also results in large phase shifts whenever the line-frequency varies. As an improvement over the simple ringing circuit, it has been suggested to employ a synchronized oscillator circuit responsive to the line-synchronizing pulses so that the effective Q is a function of signal intensity and becomes high only at very weak signals when the problem of noise discrimination is aggravated.

It has also been suggested that an electrical delay line, mismatched at one or both ends, may be employed in place of the ringing circuit to effect noise discrimination. While systems of this type are technically operable, the cost and the space requirements of an electrical delay line, of either distributed or lumped constants, are so great as to be prohibitive.

In the copending application of Robert Adler, Serial No. 308,217, filed September 6, 1952, which is a division of application Serial No. 214,881, filed March 10, 1951, now Patent No. 2,753,527, issued July 3, 1956, for "Electromechanical Pulse-Storage Lines," and assigned to the present assignee, there is disclosed and claimed a novel synchronizing system in which the line-synchronizing pulses are integrated and applied to an electromechanical pulse-storage line having a fundamental natural resonant frequency harmonically related to the nominal repetition frequency of the line-synchronizing pulses. The electromechanical pulse-storage line effectively expands the synchronizing-signal pulses selectively with respect to undesired extraneous noise pulses recurring at a rate unrelated to the natural resonant frequency of the pulse-storage line. An amplitude-selective device, such as a self-biased peak clipper, is coupled to the output of the electromechanical pulse-storage line to discriminate between the expanded synchronizing-signal pulses and the undesired noise pulses. The output of the amplitude-selective device is utilized to control the scansions of a cathode-ray beam. In a preferred embodiment, a passive oscillatory circuit tuned to the nominal repetition frequency of the line-synchronizing pulses is coupled between the output of the amplitude-selective device and the sweep-signal generator to reject random noise. Random noise is defined as continuous noise of substantially constant amplitude, attributable to thermal agitation or the like and produced in the receiving apparatus, and is to be distinguished from ignition noise and similar impulse-type disturbances herein characterized as noise pulses.

Under present governmental standards, 525-line image analysis at a frame-frequency of 30 cycles per second is employed. Moreover, present standards require double-interlace scanning so that each frame is composed of a pair of successive fields each comprising 262½ scanning lines. To insure proper interlace between successive scanning fields, the composite synchronizing waveform comprises equalizing pulses recurring at twice the nominal repetition frequency of the line-frequency synchronizing pulses during the first nine line-scanning periods of each field-frequency pedestal pulse. In fact, the fourth, fifth and sixth line scanning periods are occupied by a field-frequency synchronizing pulse, but this pulse is serrated at the equalizing-pulse frequency so that the equalizing pulses are effectively uninterrupted during the field-frequency synchronizing-pulse interval. Certain types of electromechanical pulse-storage lines and particularly the preferred construction described in the above-identified copending application, are responsive only to odd harmonics of their natural resonant frequency. Consequently, such pulse-storage lines are unresponsive to the equalizing pulses which recur at the second harmonic of the line-frequency synchronizing-pulse repetition frequency; during this interval, the pulse-storage line runs free at its natural resonant frequency.

Since the line-scanning frequency is not customarily crystal-controlled or otherwise stabilized but instead is operated at a harmonic of the power-line frequency which is subject to considerable variation in practice, a deviation of as much as plus or minus one-half percent from the established nominal repetition frequency of the line-synchronizing pulses may be encountered. Consequently, the output signal from the electromechanical pulse-storage line may drift in phase to a substantial extent with respect to the incoming line-frequency synchronizing pulses during the line-scanning interval at the beginning of each field-frequency pedestal pulse. Present standards permit from 5 to 12 line-scanning periods after the equalizing pulses before the beginning of the next ensuing scanning field. It has been found that under some operating conditions, the systems disclosed in the above-identified copending application are incapable of recovering to a state of driven synchronization with the line-frequency synchronizing pulses during these 5 to 12 line-scanning periods, with the result that a non-linear scanning distortion may be introduced in the reproduced image.

It is a primary object of the present invention to provide a synchronizing system of the general type described in the above-identified copending application but which is substantially unsusceptible to such non-linear scanning distortion.

In accordance with this invention, a new and improved synchronizing apparatus comprises a source of composite synchronizing signals of the type comprising line-frequency synchronizing pulses recurring at a predetermined nominal repetition rate, field-frequency pedestal pulses recurring at a nominal repetition rate which is low with respect to that of the line-frequency synchronizing pulses and individually comprising first and second time-contiguous intervals each of a duration substantially equal to a predetermined number of line-frequency synchronizing-pulse periods, and equalizing pulses periodically recurring throughout the first such interval of each of the field-frequency pedestal pulses at a rate equal to twice the nominal repetition rate of the line-frequency synchronizing-signal pulses. A resonant energy-storage device, having a fundamental natural resonant frequency harmonically related to the predetermined nominal repetition rate of the line-frequency synchronizing-signal pulses and having an effective time constant of the same order of magnitude as the duration of the second above-mentioned interval of one of the field-frequency pedestal pulses, is coupled to the synchronizing-signal source for selectively expanding the amplitude of the line-frequency synchronizing pulses with respect to that of undesired noise pulses. A self-biased peak clipper, including an input circuit having an effective discharge time constant longer than the effective time constant of the pulse-storage line, is coupled to the pulse-storage line for discriminating between the expanded line-frequency synchronizing pulses and the noise pulses. Means are provided for utilizing the output of the peak clipper to control the scansions of a cathode-ray beam.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
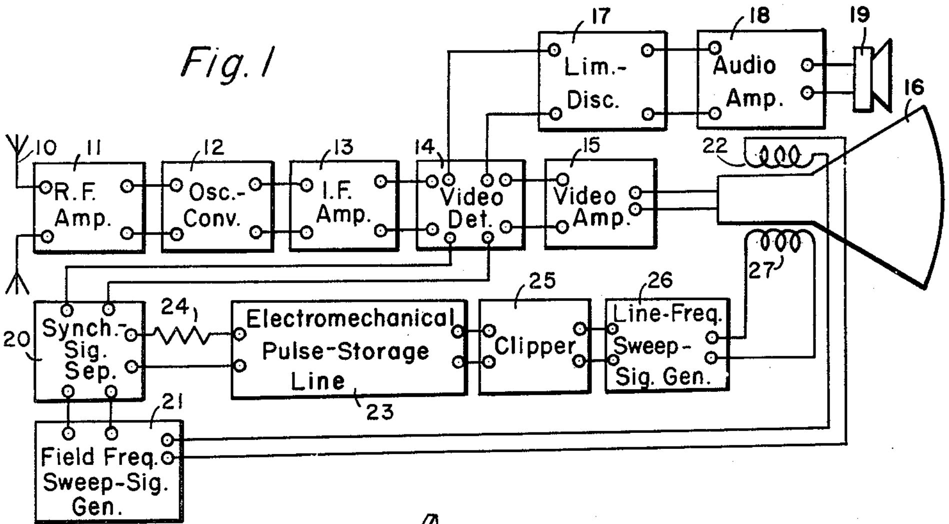
Figure 1 is a schematic diagram of a television receiver employing a synchronizing system of the type comprising an electromechanical pulse-storage line.

In the television receiver of Figure 1, incoming signals intercepted by an antenna 10 are amplified by means of a radio-frequency amplifier 11, and the amplified signals are applied to an oscillator-converter 12. Intermediate-frequency signals from oscillator-converter 12 are amplified by means of an intermediate-frequency amplifier 13 and detected by a video detector 14. The detected composite video signal from video detector 14 is amplified by means of a video amplifier 15 and applied to the input circuit of a cathode-ray tube 16 or other image-reproducing device. Intercarrier sound signals are applied from video detector 14 to a limiter-discriminator 17, and the detected audio signals are amplified by means of an audio amplifier 18 and applied to a loudspeaker 19 or other sound-reproducing device.

The composite video signal from video detector 14 is also applied to a synchronizing-signal separator 20. Field-frequency synchronizing-signal pulses from synchronizing-signal separator 20 are employed to drive a field-frequency sweep-signal generator 21 which in turn is coupled to the field-frequency deflection coils 22 associated with image-reproducing device 16.

Line-frequency synchronizing-signal pulses from synchronizing-signal separator 20 are impressed on the input terminals of an electromechanical pulse-storage line 23 through a resistor 24. The construction and operation of pulse-storage line 23 are described in greater detail hereinafter; fundamentally, a pulse-storage line is distinguished from a simple delay line in that the application of a single pulse to the input terminals results in a train of output pulses, of similar shape and of exponentially decreasing amplitude, mutually spaced by a constant predetermined time interval. The effective time constant of such a pulse-storage line is defined as the time required for a single input-pulse to decay to an amplitude of $1/e$ times its original value.

The output of electromechanical pulse-storage line 23 is impressed on the input circuit of an amplitude-selective device or clipper 25 the output of which is employed to drive a line-frequency sweep-signal generator 26 which in turn is coupled to the line-frequency deflection coils 27 associated with image-reproducing device 16.

The construction and operation of the receiver of Figure 1 are entirely conventional with the exception of the line-frequency synchronizing circuits. Briefly, line-frequency synchronization is obtained by means of synchronizing-signal separator 20, electromechanical pulse-storage line 23, clipper 25, line-frequency sweep-signal generator 26, and deflection coils 27. Line-frequency synchronizing-signal pulses from separator 20 may contain extraneous noise pulses as well as the desired synchronizing-signal components. Electromechanical pulse-storage line 23 operates to discriminate between the desired synchronizing-signal pulses and the undesired noise pulses which, if permitted to be impressed on the input circuit of the line-frequency sweep-signal generator, might result in false synchronization and defective image reproduction.

The electromechanical pulse-storage line 23 is tuned to a fundamental natural resonant frequency substantially equal to the nominal repetition frequency of the line-synchronizing pulses. Moreover, pulse-storage line 23 is constructed and arranged to provide a closed path for wave propagation by multiple reflections of the impressed signals. Consequently, the line-frequency synchronizing-signal pulses, which recur at the fundamental resonant frequency of the pulse-storage line, grow in amplitude to an extent determined by the effective time constant of the pulse-storage line, while undesired noise pulses, which recur at an irregular rate unrelated to the resonant frequency of the pulse-storage line, are not permitted to build up in amplitude. Thus the electromechanical pulse-storage line 23 functions to expand selectively the synchronizing-signal pulses with respect to the undesired noise pulses. Amplitude-selective device or clipper 25 is adjusted to be responsive to the expanded synchronizing-signal pulses but not to the noise pulses of lower amplitude. The output of clipper 25 comprises pulses recurring at the line-scanning frequency and is substantially free from undesired noise-pulse components. Line-frequency synchronization is therefore assured.

In the event that several of the line-frequency synchronizing-signal pulses should be lost in transmission, as frequently occurs in practice, scanning synchronization is not interrupted owing to the storage properties of the electromechanical line. The number of line intervals over which the system is capable of maintaining synchronization in the absence of incoming synchronizing pulses is determined by the effective time constant of the pulse-storage line.

Figures 2, 3:
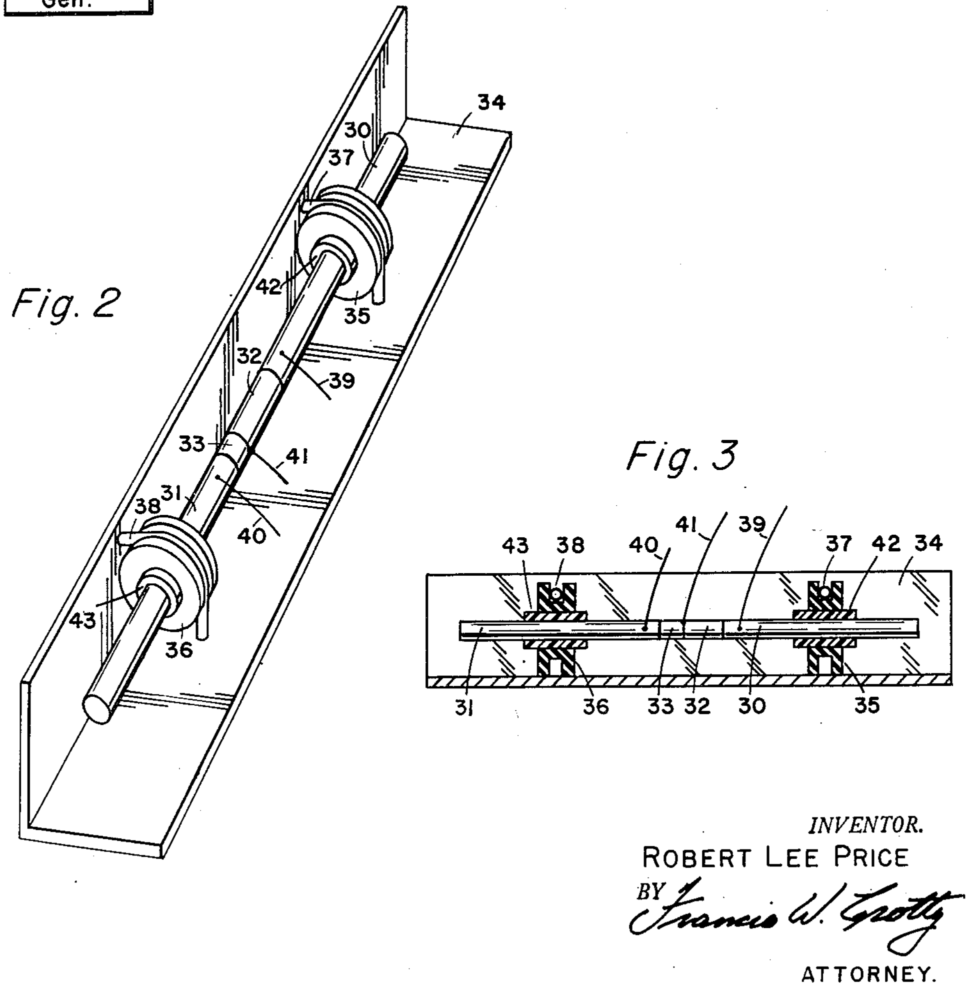
Figure 2 is a perspective view of an electromechanical pulse-storage line suitable for use in the system of Figure 1.
Figure 3 is a side elevation, partly in section, of the pulse-storage line of Figure 2.

An electromechanical pulse-storage line suitable for use in the system of Figure 1 is shown in perspective in Figure 2 and in side elevation, partly in section, in Figure 3. The pulse-storage line includes a pair of passive vibratory elements 30 and 31 and a pair of active elements, namely an input transducer 33 and an output transducer 32. The active and passive elements are of substantially the same cross-sectional area and are arranged in adjoining coaxial relationship, with the input and output transducers adjacent each other and intermediate the passive vibratory elements. The composite structure comprising the active and passive elements is supported on a bracket 34 by means of a pair of rubber grommets 35 and 36 surrounding portions of passive elements 30 and 31 respectively. Grommets 35 and 36 are secured to bracket 34 in any suitable manner, as for example, by means of clamping wires 37 and 38 secured at each end to bracket 34. The exterior ends of the composite structure are left unsupported to permit multiple reflections in a manner analogous to those obtained with an electrical delay line having a short circuit at each end.

The over-all length of the composite line structure is substantially equal to one-half the effective wave-propagation velocity of the composite structure divided by the nominal repetition frequency of the line-synchronizing pulses. The effective wave-propagation velocity is dependent on the materials used and for a structure of the type illustrated, employing ceramic transducers and steel passive elements, may be about 4800 meters per second. In accordance with present television standards, the nominal repetition frequency of the line-synchronizing pulses is 15,750 cycles per second. Consequently, the over-all length of the composite line structure is approximately 6 inches. The elements are preferably of circular cross-section, the minimum diameter being determined by practical mechanical considerations and the maximum diameter being determined by the highest significant harmonic of the fundamental frequency. If the diameter is made too small, assembly of the element becomes difficult while if the diameter is made too large, excessive harmonic dispersion is encountered. The diameter of the composite line structure, or in case a non-circular cross-section is employed the largest transverse dimension of the structure, must be smaller than one-half wavelength of the highest significant harmonic component. In practice, it has been found that harmonics above the ninth need not be accurately translated. Since, under the supposed assumption, a six-inch over-all length corresponds to one-half wavelength at the fundamental frequency, it is apparent that the largest transverse dimension of the line structure should be smaller than two-thirds of an inch. A diameter of from one-eighth inch to three-eighths inch has been found quite satisfactory.

While it is possible to excite the pulse-storage line and derive the output signals therefrom in any of a number of ways, it is preferred to employ piezo-electric transducers for the active elements 32 and 33. Specifically, it is preferred that these elements be constructed of a piezo-electric ceramic material comprising predominantly barium titanate or analogous material which is susceptible to permanent polarization after fabrication. In the embodiment of Figure 2, the composite line structure may be fabricated by forming a pair of cylindrical ceramic elements and silvering both ends of each cylinder. Passive vibratory elements 30 and 31 may be constructed of any of a number of materials capable of propagating wave energy in a longitudinal mode, and ordinary cold-rolled steel has been found quite suitable. The active and passive elements may be affixed to each other as shown in the drawing by any suitable means, as for example by soldering, to provide the desired mechanical intercoupling. After fabrication of the composite structure, terminal leads 39 and 40 may be secured to passive elements 30 and 31, thereby being placed in electrical contact with the exterior silvered surfaces of transducers 32 and 33 respectively. A third terminal lead 41 is connected to the mutually contacting silvered faces of transducers 32 and 33. The effective time constant of the line, which is largely dependent upon the amount of damping provided by the supports for the passive vibratory elements, may be adjusted by means of inserts 42 and 43 of suitable damping material, such as plasticized cellulose nitrate or the like, inserted between vibratory elements 30 and 31 and supporting grommets 35 and 36. The amount of damping, and hence the decrement and the effective time constant of the storage line, is dependent, among other things, on the length of the plastic inserts in the direction of wave propagation and their composition.

Ceramic elements 32 and 33 may be polarized so as to retain permanent piezo-electric properties, with the direction of the piezo-electric axis coincident with the axis of the composite line structure, by grounding terminal lead 41 and connecting terminal leads 39 and 40 to a suitable source of unidirectional operating potential (not shown). For best results, the electrostatic field within ceramic elements 32 and 33 should exceed 15,000 volts per centimeter and should be maintained for at least 10 or 15 minutes. After removal of the polarizing voltage, elements 32 and 33 will be found to retain the desired piezo-electric properties. The details of a preferred polarizing process are described in U. S. Patent No. 2,538,554, granted to Walter L. Cherry, Jr., on January 16, 1951, and assigned to the present assignee.

In the structure of Figure 2, element 33 is formed as a short cylinder to provide a high input capacity to the pulse-storage line, while output transducer 32 is formed as a somewhat longer cylinder to provide a high-voltage, low-capacity output.

While ordinary cold-rolled steel has been mentioned specifically as a suitable material for the passive vibratory elements, numerous other materials may be employed. Glass, ceramics, nearly any metal, and indeed most materials which may be characterized as hard, may be employed. However, it is preferred that the material of which the passive elements is constructed be of greater density than that of the material constituting the input and output transducers, in order to provide a high mechanical impedance.

The use of barium titanate ceramic materials for the input and output transducers for the pulse-storage line is preferred not only for their convenience and high electromechanical conversion efficiency, but also because such materials provide high thermal stability. Steel, glass, and other materials suitable for use in constructing the passive vibratory elements of the pulse-storage line are all characterized by a negative temperature-coefficient of the elastic modulus. On the other hand, barium titanate ceramics have the unusual property of possessing a large positive temperature-coefficient of the elastic modulus. Consequently, the combination of barium titanate transducers with the passive vibratory elements results in an advantageous temperature compensation effect. Since the velocity of wave propagation is proportional to the square root of the elastic modulus, it is apparent that the frequency stability of a line comprising barium titanate ceramic transducers is considerably enhanced by virtue of this temperature compensation effect.

Figure 4:
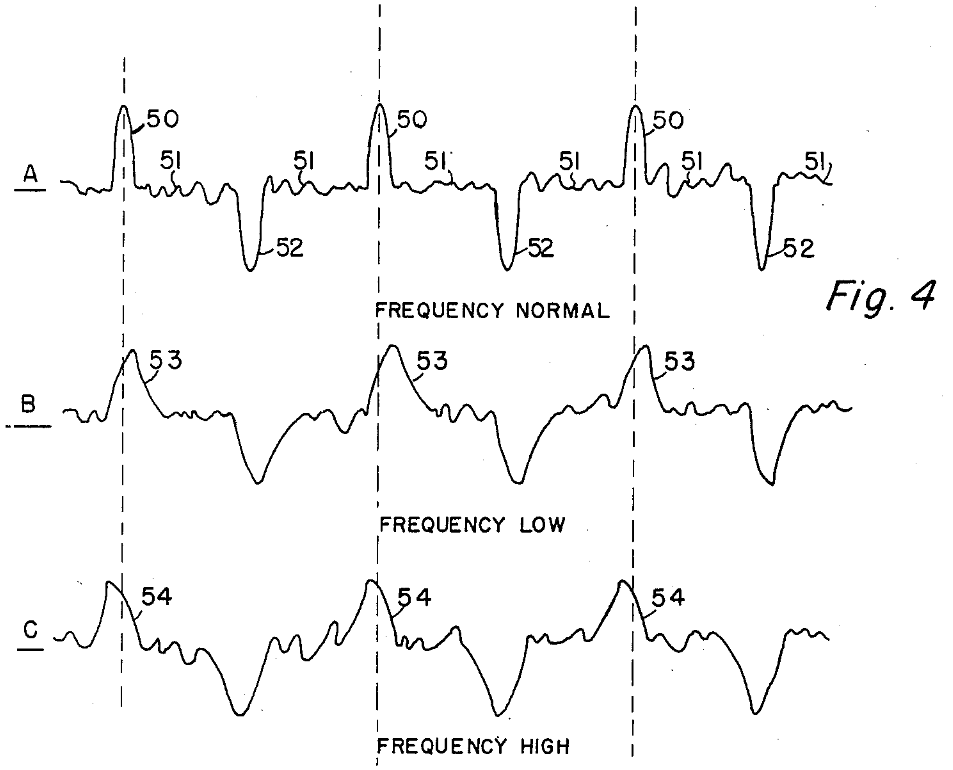
Figure 4 is a graphical representation useful in understanding the operation of the invention.

The operation of the pulse-storage line shown in Figures 2 and 3 may be readily understood by a consideration of those figures in connection with the graphical representation of Figure 4, which is a time plot of typical output signals from the pulse-storage line under different operating conditions. Generally, when an input pulse is impressed on input transducer 33, that transducer is caused to expand or contract in a longitudinal or axial direction, depending upon the polarity of the pulse and the direction of polarization of the transducer. At nearly the same instant, an output pulse is developed by output transducer 32 in response to the stress applied to that transducer by the mechanical expansion or contraction of input transducer 33. Moreover, a longitudinal-mode dilatation or compression wave is propagated in both directions from the input transducer. These waves are reflected from the open ends of the structure with a 180-degree phase reversal, so that outgoing compressions are returned as incoming dilatations and vice versa. The reflected pulses traverse the output transducer 32 after a predetermined time delay dependent upon the length of the passive elements and the wave velocity therein. These elements are so proportioned that the entire line structure is of a length appropriate to provide a total time delay, from end to end, of one-half of an operating period at the repetition frequency of the line-synchronizing pulses, or an odd integral multiple of such half-periods. Since both ends of the line are mechanically free, each reflected pulse is again reflected and produces a second output pulse component in phase with that produced by the next succeeding incoming pulse. The process is cumulative, each successive reflection being of somewhat diminished amplitude owing to the attenuation characteristics determined by the effective time constant of the storage line.

While incoming noise pulses are also subjected to multiple reflection and produce numerous discrete output pulse components, such noises pulses generally recur at an irregular rate unrelated to the natural or resonant frequency of the pulse-storage line. Consequently, time coincidence between the output pulse components produced by the reflected waves and those produced by new incident noise pulses occurs only accidentally, and cumulative increase in the noise pulse amplitude is avoided. Thus the desired synchronizing-signal pulses are effectively expanded in amplitude with respect to the undesired noise pulses. Complete segregation of the expanded synchronizing-signal pulses from the unexpanded noise pulses may be obtained by applying the output of the pulse-storage line to the input circuit of an amplitude-selective device such as a self-biased peak clipper, the output of which may then be employed to drive the scanning circuits.

The output signal from the pulse-storage line under the operating condition that the repetition frequency of the incoming line-synchronizing pulses is exactly equal to the fundamental resonant frequency of the pulse-storage line is depicted by curve A of Figure 4. Under this operating condition, the output signal A comprises expanded synchronizing pulses 50 and extraneous noise pulses 51. For a pulse-storage line of the type shown in Figure 2, of an over-all length sufficient to provide a total time delay, from end to end, of one-half of a period at the nominal repetition frequency of the synchronizing-signal pulses, the output signal A also comprises reflected pulses 52 of opposite polarity from that of the synchronizing pulses 50. From the showing of curve A it is is apparent that by passing the output signal from the pulse-storage line through a peak clipper, the noise signals 51 and the spurious reflected pulses 52 may be entirely rejected.

Under conditions presently encountered in the transmission of television signals when the line-scanning frequency is harmonically related to the power-line frequency, the repetition frequency of the incoming synchronizing pulses may deviate as much as ½% of its nominal value. Curve B of Figure 4 represents the waveform of the output signal from the electromechanical pulse-storage line during an interval when the repetition frequency of the incoming synchronizing pulses is at its maximum deviation in a negative direction from the nominal line-scanning frequency. As compared with the condition of exact synchronism represented by curve A, the expanded synchronizing pulses 53 of curve B are somewhat broadened and decreased in amplitude but are still sufficiently greater in amplitude than the intervening noise pulses to permit complete separation of the expanded synchronizing pulses. Moreover, owing to the operating characteristics of the pulse-storage line, the peaks of the expanded synchronizing pulses deviate only very slightly in time from the position occupied by the peaks of the expanded synchronizing pulses 50 of curve A when the repetition frequency of the synchronizing pulses is exactly equal to the fundamental resonant frequency of the pulse-storage line.

Similarly curve C depicts the output waveform from the pulse-storage line under the condition of maximum frequency deviation in a positive direction; the expanded synchronizing-pulse peaks are again displaced only very slightly in time from the position which they would occupy under an operating condition of exact synchronism. By employing a self-biased peak clipper to separate the expanded synchronizing pulses from the noise, nearly perfect stability of the receiver scanning system is obtained.

Since the condition of exact equality between the repetition frequency of the incoming synchronizing pulses and the fundamental resonant frequency of the pulse-storage line is an ideal one which is not encountered in practice for any protracted period of time, it is impractical to utilize the extremely high Q (defined as $\pi$ divided by the logarithmic decrement) obtainable with electromechanical lines since an extremely high-Q system is incapable of remaining in synchronism with an input signal which deviates appreciably in frequency. It is therefore necessary to strike a compromise between the desired high Q for insuring that the system remain operative during intervals when incoming synchronizing pulses may be lost and a relatively low Q to insure that the system remain in synchronism when the repetition frequency of the synchronizing pulses deviates owing to changes in the power-line frequency at the transmitter. As a practical matter, with frequency deviations of the order encountered in the operation of commercial television transmitters, it has been found in accordance with the above-identified copending Adler application that the Q of the electromechanical pulse-storage line should not exceed about 100 for reliable operation. Since the Q of an undamped electromechanical pulse-storage line may be of the order of 1000, it is necessary to provide damping for the line to reduce the Q. Such damping may be effected in the manner illustrated in Figures 2 and 3 by means of suitable damping material clamped about the passive vibratory elements. In accordance with the present invention, it has been found that an additional improvement in operation may be effected by still further reducing the Q of the pulse-storage line and by suitably proportioning the effective discharge time constant of the peak clipper input circuit in a manner to be hereinafter described in detail.

Figure 5:
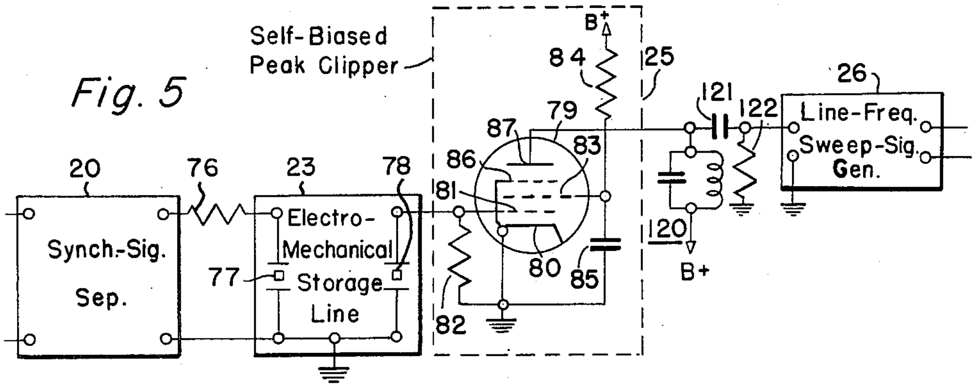
Figure 5 is a schematic circuit diagram of synchronizing apparatus embodying the invention.

In the circuit of Figure 5, which illustrates schematically a preferred construction for the line-frequency synchronizing apparatus of the receiver of Figure 1, synchronizing-signal separator 20 is coupled to electromechanical pulse-storage line 23 by means of integrating resistor 76. Resistor 76 and the inherent capacity of input transducer 77 constitute an integrating circuit and are preferably proportioned to provide an effective time constant of at least the same order of magnitude as the duration of an individual line-frequency synchronizing-signal pulse. The output transducer 78 of electromechanical pulse-storage line 23 is coupled to the input circuit of self-biased peak clipper 25.

Self-biased peak clipper 25 comprises an electron-discharge device 79 having a cathode 80 connected to ground and a control grid 81 returned to ground through an input resistor 82. Screen grid 83 of device 79 is connected to a suitable source of unidirectional operating potential, conventionally designated B+, through a resistor 84, and screen grid 83 is also by-passed to ground by means of a condenser 85. The suppressor grid 86 of device 79 is directly connected to cathode 80. The anode 87 of device 79 is coupled to B+ through a passive oscillatory circuit 120. The voltage developed across circuit 120 is impressed on a phase-shifting network comprising a series coupling condenser 121 and a shunt resistor 122 which in turn is coupled to the input of line-frequency sweep-signal generator 26.

Synchronizing-signal separator 20 may be of any suitable type but preferably is of the type performing both top and bottom clipping operations on the composite video signal from video detector 15 of Figure 1. A particularly suitable construction is disclosed and claimed in the copending application of Erwin M. Roschke et al., Serial No. 94,642, filed May 21, 1949, now Patent No. 2,656,414, issued October 20, 1953, for "Signal-Slicing Circuits," and assigned to the present assignee. A synchronizing-signal separator of this type insures a substantially uniform-amplitude line-frequency synchronizing-pulse input to electromechanical pulse-storage line 23.

Owing to the fact that input transducer 33 represents a driver of high internal elastic impedance (stiffness), this transducer is not responsive to the instantaneous magnitude of the input signal but rather to the rate of change of such magnitude. Thus the electromechanical pulse-storage line effectively performs a differentiating operation on the input signal. On the other hand, since the output transducer 32 produces a voltage which corresponds directly to the pressure applied to it, no differentiating action is effected at the output of the pulse-storage line. If a pulse-type output signal is desired, it is necessary to provide means for performing an integrating operation in series with the pulse-storage line. It would appear that the integrating operation could be performed equally well at the input to or the output from the line. Preferably, however, the inherent capacity of the input transducer is employed as the capacitive component of the integrating network and the internal resistance of the synchronizing-pulse source as at least a part of the integrating resistance. Not only does this arrangement provide the desired integrating effect with a minimum number of extra circuit elements, but it has been found that a greater output voltage is obtained in this manner than with other circuit arrangements.

In the embodiment of Figure 5, resistor 76 is selected to provide, together with the inherent capacity of input transducer 77 and the internal resistance of synchronizing-signal separator 20, a charge time constant of at least the same order of magnitude as the duration of an individual line-frequency synchronizing-signal pulse. Preferably, this time constant is made substantially equal to the pulse duration. As a typical illustrative example, the inherent capacity of a barium titanate ceramic input transducer of suitable physical dimensions may be about 100 micro-microfarads, and the resistance of synychronizing signal-separator 20 during synchronizing-pulse intervals may be of the order of 10,000 ohms. According to present standards, the duration of an individual line-frequency synchronizing-signal pulse is about 5 microseconds; consequently, resistor 76 should be about 40,000 ohms. However, during the interval between successive line-frequency synchronizing-signal pulses, device 20 is cut off and the impedance of the synchronizing-signal source may be increased to about 30,000 ohms. Consequently the discharge time constant of the integrating network is substantially greater than the charge time constant, with the result that a smaller integrating resistor may be used than would otherwise be necessary to obtain a desired pulse shape while, at the same time, the attenuation of the output-pulse amplitude attributable to integration is reduced.

The output signal from pulse-storage line 23 is impressed upon the input circuit of device 79 which functions as a self-biased peak clipper in a manner well known in the art, the inherent capacity of output transducer 78 serving as the input coupling capacity. The anode current output from peak clipper 25 comprises substantially only negative-polarity pulses in synchronism with the line-frequency synchronizing-signal pulse components of the composite video signal applied to synchronizing-signal separator 20.

In order to avoid random changes in the positioning of some picture lines relative to that of others, attributable to random noise which may be superposed on the desired line- frequency synchronizing pulses applied to the input of electromechanical pulse-storage line 23 under weak-signal conditions, singly-resonant passive oscillatory circuit or ringing circuit 120 is inserted between the self-biased peak clipper 25 and the line-frequency sweep-signal generator 26. Ringing circuit 120 is tuned to the nominal repetition frequency of the line-synchronizing pulses and is preferably constructed with a Q of from 10 to 50. Since pulse-storage lines are generally of higher Q than ringing circuits, one might assume that cascading the ringing circuit with the pulse-storage line would afford no useful results. In fact, however, it has been found that a surprisingly great improvement is obtained by employing a ringing circuit in cascade with the pulse-storage line as shown in Figure 5. The electromechanical pulse-storage line 23 is primarily effective in eliminating undesired ignition noise pulses and the like but is substantially less effective in eliminating random noise superposed on the line-frequency synchronizing pulses during weak-signal reception. On the other hand, ringing circuit 120 is extremely effective in eliminating the phase instability of the sweep-driving pulses caused by random noise passed by the pulse-storage line.

The synchronizing apparatus thus far described is substantially identical with the preferred embodiment of the above-identified copending Adler application. In accordance with the present invention, a particular relationship between the effective time constant of the electromechanical pulse-storage line and the effective discharge time constant of the input circuit of the self-biased peak clipper is maintained for a purpose which will become apparent from a consideration of the waveforms and operating characteristics graphically represented in Figure 6. Specifically the effective time constant of the electromechanical pulse-storage line is made of the same order of magnitude as the duration of that portion of a field-frequency pedestal pulse following the equalizing-pulse interval, and the effective discharge time constant of the input circuit of the self-biased peak clipper is made greater than the effective time constant of the electromechanical pulse-storage line.

Figure 6:
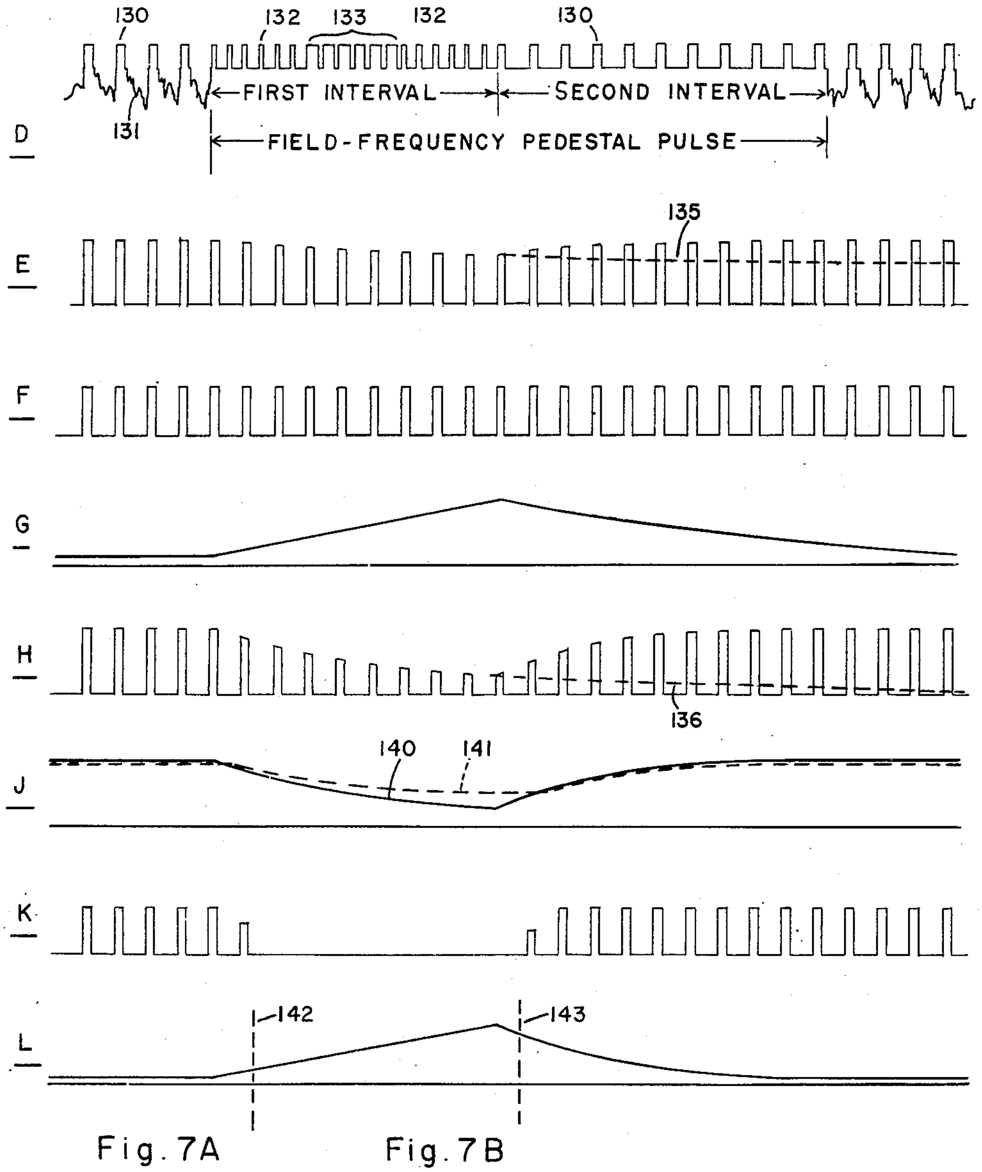
Figure 6 is a graphical representation for facilitating an understanding of the operation of the invention.

Waveform D of Figure 6 is a graphical representation, not drawn to an accurate scale, of a conventional composite television signal in accordance with present governmental standards. The signal represented in waveform D comprises line-frequency synchronizing pulses 130 recurring at a predetermined nominal repetition rate, presently set at 15,750 cycles per second. The line-frequency synchronizing pulses are superposed on line-frequency pedestal pulses between which appear the video-frequency signal components 131 representing the picture information. The composite television signal also comprises field-frequency pedestal pulses recurring at a repetition rate lower than that of the line-frenquency synchronizing pulses, presently set at 60 cycles per second. Each field-frequency pedestal pulse comprises first and second time-contiguous intervals, so labeled in the drawing. Equalizing pulses 132, periodically recurring at a rate equal to twice that of the line-frequency synchronizing pulses 130, are superposed on the field-frequency pedestal pulses during the first interval of each such pedestal pulse to insure proper interlace of successive fields. Under present standards, equalizing pulses 132 occur during the first three and the last three line-synchronizing periods of the first interval of each field-frequency pedestal pulse, while field-frequency synchronizing pulses 133 are superposed on the field-frequency pedestal pulse during the middle three line-synchronizing periods. The field-frequency synchronizing-signal pulses, however, are serrated to provide suitable interlacing information throughout the entire first interval, and for the purpose of the present application the equalizing pulses are considered to extend throughout the entire nine line-synchronizing periods constituting the first interval of each field-frequency pedestal pulse. Conventional line-frequency synchronizing pulses are superposed on the field-frequency pedestal pulses during the second interval of each such pedestal pulse for the remainder of the field-frequency retrace period. According to present standards, the duration of the second interval may be standardized at from five to twelve line-synchronizing periods; under the predominant present commercial practice, the duration of the second interval of each field-frequency pedestal pulse is ten or eleven line-synchronizing intervals.

Waveform E represents in idealized form the output pulses from the electromechanical pulse-storage line in a system of the type described in the aforementioned Adler application, the spurious negative-polarity reflected pulses being omitted in order to avoid confusing the drawing. In such a system, the effective time constant of the pulse-storage line is made as high as possible to insure that the system remain operative during intervals when incoming synchronizing pulses may be lost while still maintaining scanning synchronism when the repetition frequency deviates owing to changes in the power-line frequency at the transmitter. During the first or equalizing-pulse interval of each field-frequency pedestal pulse, the pulse-storage line receives no effective driving impulses, and the output of the pulse-storage line decays exponentially in amplitude at a relatively low rate determined by the effective time constant of the pulse-storage line. The dotted line 135 represents the envelope of the output pulses which would be obtained from the pulse-storage line if no further line-frequency synchronizing pulses were impressed on the line input. Throughout the second interval of each field-frequency pedestal pulse, however, line-frequency synchronizing pulses are again impressed on the input to the pulse-storage line, and the line output builds up in amplitude to its original or stable value. Since the effective time constant of the pulse-storage line is long with respect to the first or equalizing-pulse interval, the decrease in output pulse amplitude from the pulse-storage line during the equalizing pulse interval is relatively small, and the anode current pulses in the output circuit of the self-biased peak clipper are uninterrupted as shown in waveform F.

While operation in this manner is desirable in the event that the incoming line-frequency synchronizing pulses are crystal-controlled or otherwise stabilized in frequency, additional considerations enter in when the repetition frequency of the incoming line-synchronizing pulses is subject to deviation as in present commerical practice. The detrimental effects which may result from such deviation of the line-synchronizing pulse repetition frequency may be understood by assuming an extreme condition in which the actual repetition frequency of the incoming synchronizing pulses differs by one-half percent from the fundamental natural resonant frequency of the pulse-storage line. Since the pulse-storage line runs free at its own natural resonant frequency during the nine line-scanning periods constituting the first or equalizing-pulse interval of each field-frequency pedestal pulse, a cumulative phase shift is produced between the output of the pulse-storage line and the incoming line-synchronizing pulses during this interval. For the postulated synchronizing-pulse frequency deviation of one-half percent, the total phase shift during the equalizing-pulse interval amounts to one-half percent times nine line-scanning intervals, representing a 4½% shift in the scanning position at the start of the second interval. While the output from the pulse-storage line again builds up to its full amplitude before the end of the field-frequency pedestal pulse, a large part of the output pulse energy corresponding to envelope 135, represents incorrect phasing information stored by the pulse-storage line during the equalizing-pulse interval. Consequently, the ringing circuit 120 is driven by anode current pulses from the self-biased peak clipper 25 which contain a relatively large amount of incorrect phasing information. Since the effective time constant of the pulse-storage line is relatively long with respect to the second interval of the field-frequency pedestal pulse, this incorrect phasing information is not dissipated until well into the next scanning field, and a non-lienar scanning distortion which manifests itself as a very noticeable bend at the top of the reproduced image is encountered.

Figure 7A:
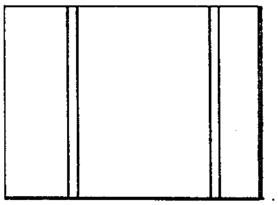
Figures 7A and 7B are schematic representations illustrating the effect of the invention in correcting non-linear scanning distortion.

This condition is perhaps more easily understandable from curve G which is a plot of the phase shift as a function of time, the condition for exact phase and frequency synchronism with the incoming line-synchronizing pulses being represented by the zero-ordinate axis. During the first or equalizing-pulse interval of each field-frequency pedestal pulse, the phase shift increases cumulatively at a rather rapid rate determined by the deviation of the incoming line-synchronizing pulse repetition frequency from the natural resonant frequency of the pulse-storage line. When line-frequency synchronizing pulses are again impressed on the input of the pulse-storage line at the beginning of the second interval, the cumulative phase shift begins to decrease; however, this decrease is effected at a much lower rate determined by the effective time constant of the pulse-storage line. Consequently, a considerable amount of phase shift from the desired condition represented by the zero-ordinate axis remains at the beginning of the ensuing scanning field. The effect of this phase shift is to introduce a non-linear scanning distortion in the reproduced image, so that a received signal representing a transmitted image of the type shown in Figure 7A is reproduced in the manner shown in Figure 7B.

Non-linear scanning distortion of this type is substantially avoided in a system constructed in accordance with the present invention, wherein the effective time constant of the pulse-storage line is made of the same order of magnitude as the duration of the second interval of one of the field-frequency pedestal pulses and the effective discharge time constant of the peak clipper input circuit is made longer than the effective time constant of the pulse-storage line. With a system of this type, the output pulses from the pulse-storage line may be ideally represented by waveform H of Figure 6. Since the effective time constant of the pulse-storage line is much lower than in systems constructed in accordance with the above-identified copending Adler application, the amplitude of the output pulses from the pulse-storage line decreases at a much faster rate during the first or equalizing-pulse interval of each field-frequency pedestal pulse. During the second interval of each such pedestal pulse, the output from the pulse-storage line again builds up to its stable level. The envelope 136 representing incorrect phasing information decays to insignificant proportions much more rapidly than envelope 135 of curve E.

The envelope of the output pulses from the pulse-storage line is plotted as curve 140 of waveform J. Since the effective discharge time constant of the peak clipper input circuit is made longer than the effective time constant of the pulse-storage line, the negative self-bias generated by the peak clipper input circuit is incapable of decreasing as rapidly as the amplitude of the output pulses from the pulse-storage line during the first or equalizing-pulse interval of each field-frequency pedestal pulse. Consequently, during the equalizing-pulse interval when the pulse-storage line runs free at its natural resonant frequency, the output pulses from the pulse-storage line are of insufficient amplitude to produce corresponding anode current pulses in the output circuit of the self-biased peak clipper. As a consequence, the driving current pulses supplied to the ringing circuit are interrupted in the manner represented by waveform K. For this reason, although the output pulses from the pulse-storage line during the equalizing-pulse interval represent incorrect phasing information, this incorrect phasing information is not stored in the ringing circuit. Moreover, the incorrect phasing information stored in the pulse-storage line is more rapidly dissipated owing to the shorter effective time constant of the pulse-storage line, with the result that both the pulse-storage line and the ringing circuit may more readily be restored to a condition of exact phase and frequency synchronism with the incoming line-synchronizing pulses during the second interval of each field-frequency pedestal pulse.

Figure 7B:
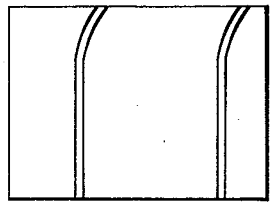

Thus the effect of providing the pulse-storage line with an effective time constant of the same order of magnitude as the second interval of one of the field-frequency pedestal pulses and proportioning the peak clipper input circuit so that its effective discharge time constant is longer than the effective time constant of the pulse-storage line is to insure that the ringing circuit is supplied either with substantially correct phasing information or with no information at all. This condition is represented by curve L which is a time plot of the phase shift encountered in such a system. The phase shift increases during the equalizing-pulse interval at substantially the same rate as in the system employing a pulse-storage line having a longer effective time constant, since this rate is determined substantially only by the deviation of the line-synchronizing pulse repetition rate from the natural resonant frequency of the pulse-storage line. However, the phase shift decreases at a much more rapid rate during the second interval of each field-frequency pedestal pulse when the pulse-storage line is again supplied with incoming line-synchronizing pulses, since the incorrect phasing information is dissipated more rapidly by the pulse-storage line. Moreover, no pulses are impressed on the ringing circuit during the interval between lines 142 and 143; in other words, substantially no incorrect phasing information is stored in the ringing circuit. As a consequence, the objectionable bend at the top of the reproduced image, represented in Figure 7B, is eliminated.

Merely by way of illustration and in no sense by way of limitation, the desired operating condition may be achieved by employing an electromechanical pulse-storage line having a Q of about 40, corresponding to an effective time constant of about 800 microseconds, and by employing a peak clipper input circuit having a discharge time constant of about 1,000 microseconds. The effective time constant of the electromechanical pulse-storage line may be determined as the product of the line-Q and the duration of a single line-scanning interval divided by pi ($\pi$) and is dependent largely on the amount of damping, provided for example by inserts 42 and 43 in the construction of Figures 2 and 3. The discharge time constant of the peak clipper input circuit is defined as the product of the effective input coupling capacity and the resistance of the grid leak resistor. In practice, the input coupling capacity is constituted either in whole or in part by the inherent capacity of the output transducer 32 of the pulse-storage line, which may have a value, for example, of about 50 micro-microfarads. The desired discharge time constant of 1,000 microseconds may then be obtained by employing a grid leak resistor of 20 megohms. The ringing circuit connected to the output of the peak clipper may have a Q of about 30. These circuit parameters have been found to insure satisfactory operation in accordance with the present invention when the received composite television signal is of the type specified by present governmental standards and, as is the conventional practice, the total duration of each field-frequency pedestal pulse is about 19 or 20 line-scanning intervals.

Thus the present invention provides a new and improved system for maintaining scanning synchronism in a television receiver or the like. The system retains the fundamental advantages inherent in the use of an electromechanical pulse-storage line for providing noise discrimination while avoiding the disadvantage sometimes encountered in systems constructed in accordance with the above-identified copending Adler application of non-linear scanning distortion manifesting itself as an objectionable bend at the top of the reproduced image.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; a resonant energy-storage device, including a multiple-reflection pulse-storage line having a fundamental natural resonant frequency harmonically related to said predetermined nominal repetition rate and having an effective time constant of the same order of magnitude as the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; and means for utilizing the output of said peak clipper to control the scansions of a cathode-ray beam.

2. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency harmonically related to said predetermined nominal repetition rate and having an effective time constant of the same order of magnitude as the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; and means for utilizing the output of said peak clipper to control the scansions of a cathode-ray beam.

3. Synchronizing apparatus comprising: a source of composite synchronizing signals of the type comprising line-fresuency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency harmonically related to said predetermined nominal repetition rate and responsive only to odd harmonics of said fundamental resonant frequency and having an effective time constant of the same order of magnitude as the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; and means for utilizing the output of said peak clipper to control the scansions of a cathode-ray beam.

4. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency substantially equal to said predetermined nominal repetition rate and responsive only to odd harmonics of said fundamental resonant frequency and having an effective time constant of the same order of magnitude as the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; and means for utilizing the output of said peak clipper to control the scansions of a cathode-ray beam.

5. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency substantially equal to said predetermined nominal repetition rate and responsive only to odd harmonics of said fundamental resonant frequency and having an effective time constant not materially greater than the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; and means for utilizing the output of said peak clipper to control the scansions of a cathode-ray beam.

6. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency harmonically related to said predetermined nominal repetition rate and responsive only to odd harmonics of said fundamental resonant frequency and having an effective time constant of the same order of magnitude as the duration of one said second interval, coupled to said source for selectively expanding the amplitude of said line-frequency synchronizing pulses with respecct to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; a sweep-signal generator; means coupled to said peak clipper and to said sweep-signal generator for rejecting undesired random noise; and means for utilizing the output of said sweep-signal generator to control the scansions of a cathode-ray beam.

7. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line, having a fundamental natural resonant frequency harmonically related to said predetermined nominal repetition rate and responsive only to odd harmonics of said fundamental resonant frequency and having an effective time constant of the same order of magnitude as the duration of one said second interval, coupled to said source for selectively expanding the amplitude of said line-frequency synchronizing pulses with respect to that of undesired noise pulses; a self-biased peak clipper, including an input circuit having an effective discharge time constant longer than said first-mentioned time constant, coupled to said pulse-storage line for discriminating between said expanded line-frequency synchronizing pulses and said noise pulses; a passive oscillatory circuit tuned substantially to a frequency corresponding to said predetermined nominal repetition rate and coupled to said peak clipper for rejecting undesired random noise; and means coupled to said oscillatory circuit for controlling the scansions of a cathode-ray beam.

8. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line having piezo-electric input and output transducers, having a fundamental natural resonant frequency harmonically related to said predetermined nominal repetition rate and responsive only to odd harmonics of said fundamental resonant frequency, and having an effective time constant of the same order of magnitude as the duration of one said second interval; means coupling said input transducer to said source, whereby said pulse-storage line functions effectively to expand the amplitude of said line-frequency synchronizing pulses selectively with respect to that of undesired noise pulses; a self-biased peak clipper, including an input circuit comprising the inherent capacity of said output transducer and having an effective discharge time constant longer than said first-mentioned time constant, coupled to said output transducer for discriminating between said expanded line-frequency synchronizing pulses and said noise pulses; and means for utilizing the output of said peak clipper to control the scansions of a cathode-ray beam.

9. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line having piezo-electric input and output transducers, having a fundamental natural resonant frequency harmonically related to said predetermined nominal repetition rate and responsive only to odd harmonics of said fundamental resonant frequency, and having an effective time constant of the same order of magnitude as the duration of one said second interval; means coupling said input transducer to said source, whereby said pulse-storage line functions effectively to expand the amplitude of said line-frequency synchronizing pulses selectively with respect to that of undesired noise pulses; a self-biased peak clipper, including an input circuit comprising a resistor and the inherent capacity of said output transducer and having an effective discharge time constant longer than said first-mentioned time constant, coupled to said output transducer for discriminating between said expanded line-frequency synchronizing pulses and said noise pulses; and means for utilizing the output of said peak clipper to control the scansions of a cathode-ray beam.

10. Synchronizing apparatus comprising: a source of composite synchronizing signals of the type comprising line-frequency synchronizing pulses recurring at a predetermined nominal repetition rate, field-frequency pedestal pulses recurring at a nominal repetition rate which is low with respect to said predetermined rate and individually comprising first and second time-contiguous intervals each of a duration substantially equal to a predetermined number of line-frequency synchronizing-pulse periods, and equalizing pulses periodically recurring throughout the first said interval of each of said field-frequency pedestal pulses at a rate equal to twice said predetermined rate; an electromechanical pulse-storage line having piezo-electric input and output transducers, having a fundamental natural resonant frequency harmonically related to said predetermined nominal repetition rate and responsive only to odd harmonics of said fundamental resonant frequency, and having an effective time constant of the same order of magnitude as the duration of one said second interval; means coupling said input transducer to said source, whereby said pulse-storage line functions effectively to expand the amplitude of said line-frequency synchronizing pulses selectively with respect to that of undesired noise pulses; a self-biased peak clipper, including an input circuit comprising a resistor and the inherent capacity of said output transducer and having an effective discharge time constant longer than said first-mentioned time constant, coupled to said output transducer for discriminating between said expanded line-frequency synchronizing pulses and said noise pulses; and means for utilizing the output of said peak clipper to control the scansions of a cathode-ray beam.

References Cited in the file of this patent

UNITED STATES PATENTS

| | | |
|---|---|---|
| 2,101,272 | Scott | Dec. 7, 1937 |
| 2,175,038 | Schlesinger et al. | Oct. 3, 1939 |
| 2,263,902 | Percival | Nov. 25, 1941 |
| 2,522,706 | Di Toro | Sept. 19, 1950 |
| 2,552,139 | Boccairelli | May 8, 1951 |
| 2,656,414 | Roschke et al. | Oct. 20, 1953 |
| 2,698,358 | Hoyt | Dec. 28, 1954 |

FOREIGN PATENTS

| | | |
|---|---|---|
| 899,987 | France | June 15, 1945 |